United States Patent
Holtkamp

(10) Patent No.: US 6,722,972 B1
(45) Date of Patent: Apr. 20, 2004

(54) SAFETY RELEASE FOR CURTAINS USED IN LIVESTOCK CONFINEMENT BUILDINGS

(76) Inventor: Eric T. Holtkamp, 96 Forest Blvd., #3, Humboldt, IA (US) 50548

( * ) Notice: Subject to any disclaimer, the term of this patent is extended or adjusted under 35 U.S.C. 154(b) by 0 days.

(21) Appl. No.: 10/392,414

(22) Filed: Mar. 18, 2003

(51) Int. Cl.[7] .................................................. F24F 7/00
(52) U.S. Cl. ........................ 454/256; 454/239; 119/448
(58) Field of Search ................................ 454/256, 239, 454/258, 229; 119/448; 49/30, 31; 160/9; 254/375

(56) References Cited

U.S. PATENT DOCUMENTS

| | | |
|---|---|---|
| 4,428,278 A | 1/1984 | Sutton |
| 4,605,162 A * | 8/1986 | Crider ........................ 236/49.5 |
| 5,325,813 A | 7/1994 | Sutton |
| 5,924,924 A | 7/1999 | Richardson |
| 6,102,793 A * | 8/2000 | Hansen ........................ 454/342 |
| 6,341,582 B1 * | 1/2002 | Gompper et al. ........... 119/840 |

* cited by examiner

*Primary Examiner*—Jiping Lu
(74) *Attorney, Agent, or Firm*—Sturm & Fix LLP

(57) ABSTRACT

Confinement houses such as those housing poultry or hogs are artificially ventilated. To provide fresh air, there are openings along the walls. To control the amount of effective opening, fabric curtains are provided to cover the openings to varying degrees, depending on the inside conditions. The curtain opening is manipulated by a linear actuator and a manual hand-crank. When the power grid is interrupted for more than a moment, ventilation fans stop and the livestock become in danger of asphyxiation. As a fallback strategy, the curtains are opened fully by releasing the manual hand-crank, permitting it to spin as the curtains fall open under their own weight. A tension device such as a cord, chain, cable, string or wire runs between the manual hand-crank and a safety ventilation curtain release device. The safety ventilation curtain release device will release the tension device when the power grid has been off for a predetermined time. Releasing of the tension device is enhanced by a repulsive force from either a pair of permanent magnets with like poles adjacent to one another or a spring.

20 Claims, 12 Drawing Sheets

SAFETY RELEASE FOR CURTAINS USED IN LIVESTOCK CONFINEMENT BUILDINGS

BACKGROUND OF THE INVENTION

1. Field of the Invention

The present invention relates generally to a safety mechanism. More particularly the present invention relates to a safety release device for providing adequate ventilation for a livestock confinement operation in the event of a sustained power loss.

2. Background Art

Livestock raising operations are often confinement operations, today. Large numbers of livestock are housed inside a building with artificial lighting and ventilation. Because the livestock must have ventilation to survive, when electrical power fails for more than a few minutes, special measures must be taken to ensure that ventilation.

Ventilation is provided by fans, in normal circumstances, with heavy curtains over openings in the confinement building walls to provide a path for air to enter the confinement space. The amount of opening of the curtains is normally dictated by the building temperature and fresh air requirements. Opening and closing the heavy (2000–4000 lb.) curtains is accomplished by a screw actuator connected to a cable. Manual operation is also possible via a hand crank.

When the utility grid goes down, the usual action is to release the manual hand crank after a brief delay. The crank, after being released, will spin due to the weight of the curtains. The curtains are open providing ventilation when they are lowered.

A device for releasing the manual crank for ventilation curtains in a livestock confinement operation was disclosed by Sutton in U.S. Pat. No. 5,325,813. The device is mounted at the crank handle and cradles the handle in a hook. The hook is held in the "hold" position by an electromagnet. When power is interrupted to the electromagnet, the hook is released which releases the crank and permits the curtains to drop. The release system is not contained in a single unit. The electrical box to which the electromagnet is wired is separate from the hook and electromagnet unit.

In U.S. Pat. No. 4,428,278, Sutton discloses a different livestock curtain release device. This one is also held in the "hold" position by an electromagnet, but the handle of the manual crank is connected to the release device via a rope. The release device must be carefully mounted at an angle providing secure holding, but also resulting in a proper release when the power is interrupted. This device will not usually release the rope if there is no tension in the rope due to frozen curtains or a rusty mechanism.

A delay, so the release mechanism can sustain very brief power interruptions, is provided by capacitors. This system is, again, not contained in a single unit.

A commonly used curtain safety release device is disclosed in U.S. Pat. No. 4,605,162. This device uses a U-shaped "expansion finger" inserted in a sleeve. The sleeve is heated (using resistance heat) and the expansion finger expands due to the higher temperature. This provides the security for holding the manual curtain crank and also the delay for tolerating very brief power outages. The sleeve and expansion finger represent significant thermal mass, which take some time to cool down when the resistance heat is interrupted. The manual curtain crank is held by a lever. The lever is held by a cord or cable operably attached to the expansion finger. When the sleeve cools, the cord is released and the lever arm pivots out of the way so the crank will release.

The U-shaped expansion finger is bent to the required shape by an operator—introducing a possible error in the system. When first engaging the curtain release system, the operator must hold the device until it is adequately heated to secure the crank in the "hold" position. This may take several minutes.

This curtain release device will not function if there is no tension in the cord. Again, if the curtains are frozen or the crank mechanism is slightly rusty, the release action may fail. Also, conditions that enhance heat transfer from the sleeve such as a cold rain can cause this device to fail.

A simple electromagnetic device with a battery backup is disclosed in U.S. Pat. No. 5,924,924. This invention is a short chain, anchored to a wall at one end and connected to an electromagnet at the other. An armature is operably connected to the manual curtain crank, and is magnetically attached to the electromagnet when the electromagnet is energized. When the electromagnet is not energized, the armature drops off and the crank is free to rotate and let the ventilation curtains drop.

The unit is backed up by a battery to provide a delay for when the utility grid is interrupted for only a brief time. A timer provides the actual duration of delay. If the timing circuit fails for any reason, the battery has the capacity to maintain energy to the electromagnet well beyond the point at which the livestock begin to suffer due to lack of ventilation.

There is, therefore, a need for a method and device for automatically and reliably permitting the opening of the ventilation curtains in a livestock confinement building. There is a further need for a ventilation curtain release system that is contained in a single unit.

SUMMARY OF THE INVENTION

A purpose of this invention is to provide a simple, reliable method and apparatus for releasing ventilation curtains in a livestock confinement building when the power to the forced ventilation system fails for more than a brief time. Such confinement buildings include, but are not limited to, poultry houses and hog confinement buildings.

A screw actuator is modulated by a control system to vary the opening of the ventilation curtains based on the needs of the livestock inside. A hand-crank is provided for manually carrying out the same operation. If the hand-crank is released, the weight of the ventilation curtains will cause the crank to spin, allowing the ventilation curtains to open.

If utility grid power is interrupted, the preferred failed-mode of the curtains is 100% open, to assure adequate ventilation is provided to the livestock in the building. To effect this 100% opening without power, the manual hand-crank is automatically released.

A safety ventilation curtain release device comprises a hinged plate with an integral hook, an electromagnet and either two permanent magnets or a spring. The hinged plate is maintained in a desired position by the electromagnet. The hook engages one end of a tension device, which would be a device such as a cord, chain, cable, string or wire. The other end of the tension device is attached to the manual hand-crank. In one embodiment of the invention, two permanent magnets are mounted with like poles adjacent to one another, one permanent magnet on the hinged plate, the other on a stationary plate. In a second embodiment, a spring replaces the permanent magnets. When the utility grid is interrupted, capacitors provide power to the electromagnet for a known period of time. Once the capacitors have discharged sufficiently, the electromagnet releases the hinged plate. The permanent magnets in the first embodiment, or the spring in the second embodiment provide a force to the hinged plate to ensure it will pivot away from the electromagnet and release the tension device.

The safety ventilation curtain release device is powered using the same 240 volt circuit the ventilation fans utilize. If either or both legs of the power are interrupted, the capacitors will continue to energize the electromagnet for a predetermined time span from the instant power is lost. When the capacitors have discharged, the electromagnet is deenergized, causing the curtains to drop, unless electrical power is restored before the capacitors have deenergized.

The capacitors used in the safety ventilation curtain release device are supercapacitors providing a total capacitance on the order of 100 Farads.

The safety ventilation curtain release device is packaged in a single unit, requiring only to be plugged into the same circuit as that of the ventilation fans, and affixed to a stationary surface somewhat near the manual curtain handcrank.

The novel features which are believed to be characteristic of this invention, both as to its organization and method operation together with further objectives and advantages thereto, will be better understood from the following description considered in connection with accompanying drawings in which a presently preferred embodiment of the invention is illustrated by way of example. It is to be expressly understood however, that the drawings are for the purpose of illustration and description only and not intended as a definition of the limits of the invention.

BEST MODE FOR CARRYING OUT THE INVENTION

Figure 1:
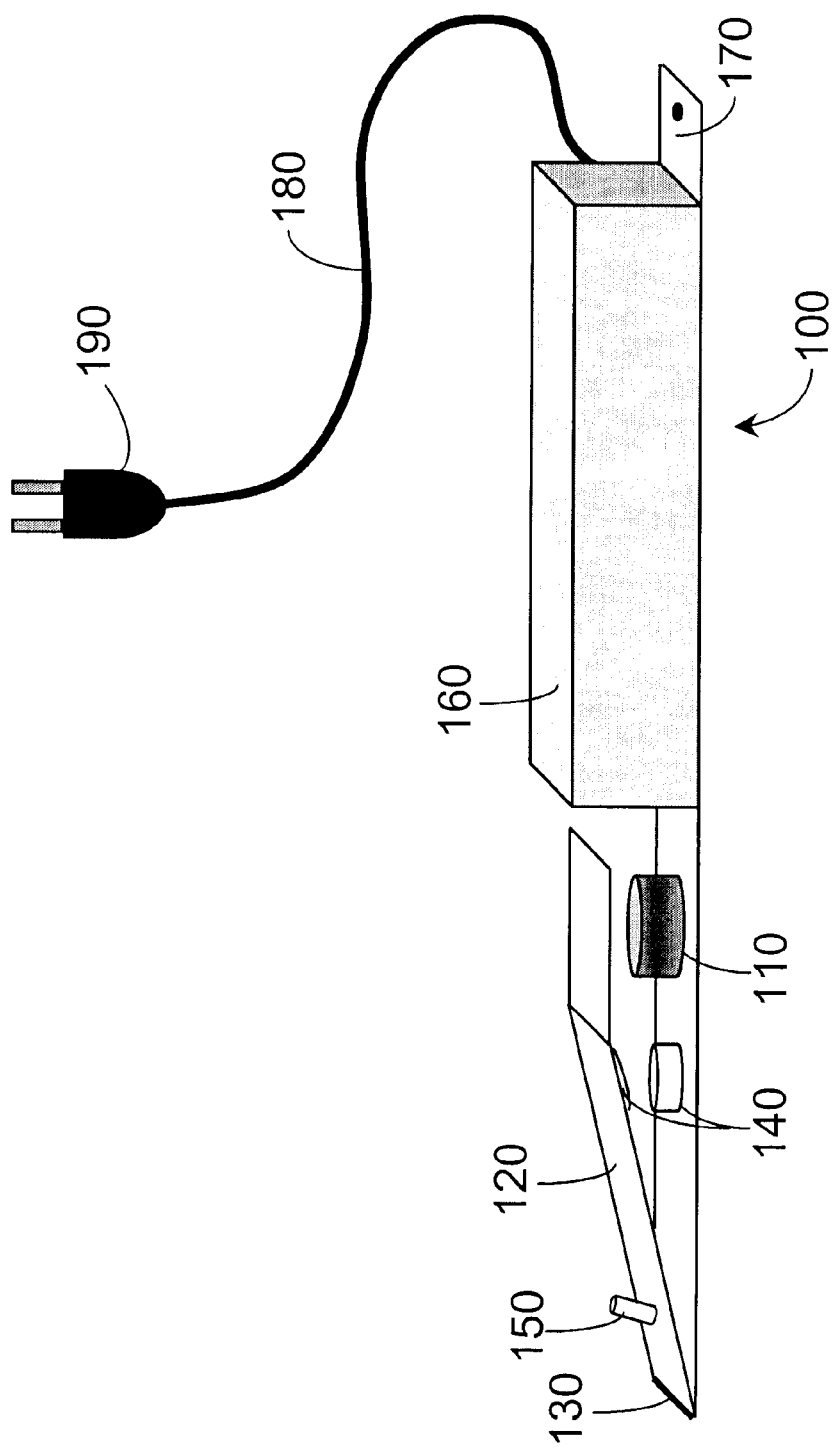
FIG. 1 is a perspective view of a safety ventilation curtain release device.

A safety ventilation curtain release device 100 is shown in FIG. 1. An electromagnet 110 is used to secure a hinged plate 120 when electrical power is available. The hinged plate 120 pivots on a hinge 130. In one embodiment of the invention, two permanent magnets 140 are mounted with like poles adjacent to one another to provide a continuous repulsive force to the hinged portion 120 in its open or unlatched direction. A hook or peg 150 is mounted to the hinged plate 120 to provide a place to hook a tension device, which is defined herein as a device such as a cord, chain, cable, string or wire. Electronics, including supercapacitors to provide a tolerance to very brief interruptions to the electrical power, are contained in an electrical box 160. The safety ventilation curtain release device 100 may be mounted to a wall, post, ceiling, or other secure mount via a mounting plate 170. A power cord 180 carries electrical current from the grid to the electrical box 160. A plug 190, suitable for a 240 volt electrical outlet, provides for quick installation and replacement of the safety ventilation curtain release device 100.

Figure 2:
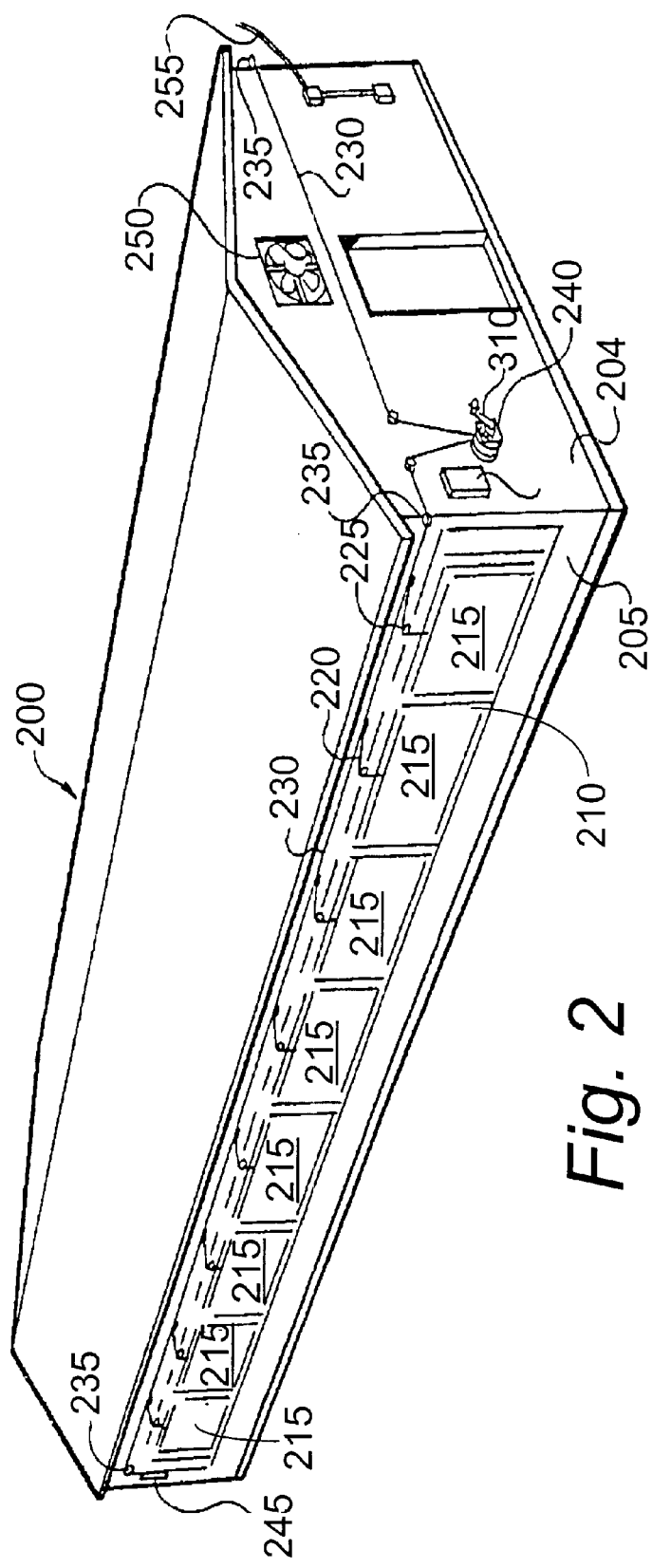
FIG. 2 is a perspective view of a livestock confinement house with curtains for ventilation.

A livestock confinement house 200, such as a poultry house or hog confinement house, is shown in FIG. 2. The house 200 includes a relatively short end wall 204 and a relatively long side wall 205. The side wall 205 and the opposite side wall (not shown) are provided with ventilation openings 210 which extend substantially their entire length. Manually operated curtains 215 (see also FIG. 3), fabricated of any suitable flexible material, are normally secured to the side walls 205 immediately below the ventilation openings 210. Curtain cords 220 are suitably attached to the upper edge of the curtains 215 and are used to raise the curtains 215 to cover the ventilation openings 210. Each of the curtain cords 220 pass around a suitably positioned pulley 225 and are secured at their other end to a cable 230 which extends the length of the side wall 205. The cable 230 is maintained in its longitudinally extended position by means of two pulleys 235, one positioned at each end of the side walls 205.

A winch 240 is suitably positioned on the end wall 204 and is used for reeling the cable 230 in or out, as desired. As is shown in FIG. 2, the winch 240 can be used to reel in the cable 230 from both side walls 205 of the confinement house 200. A counterweight 245 is secured to the cable 230 on the end curtains 215 when the winch 240 is being unreeled.

As is apparent from the foregoing, the curtains 215 will fall from the ventilation openings 210 under their own weight when the cable 230 is allowed to unreel from the winch 240.

An electrically operated ventilation fan 250 is shown positioned on the end of the house 200. The fan 250 is supplied electric current by an electrical power supply 255 and normally operates to continuously circulate fresh air through the interior of the house 200.

Figure 3:
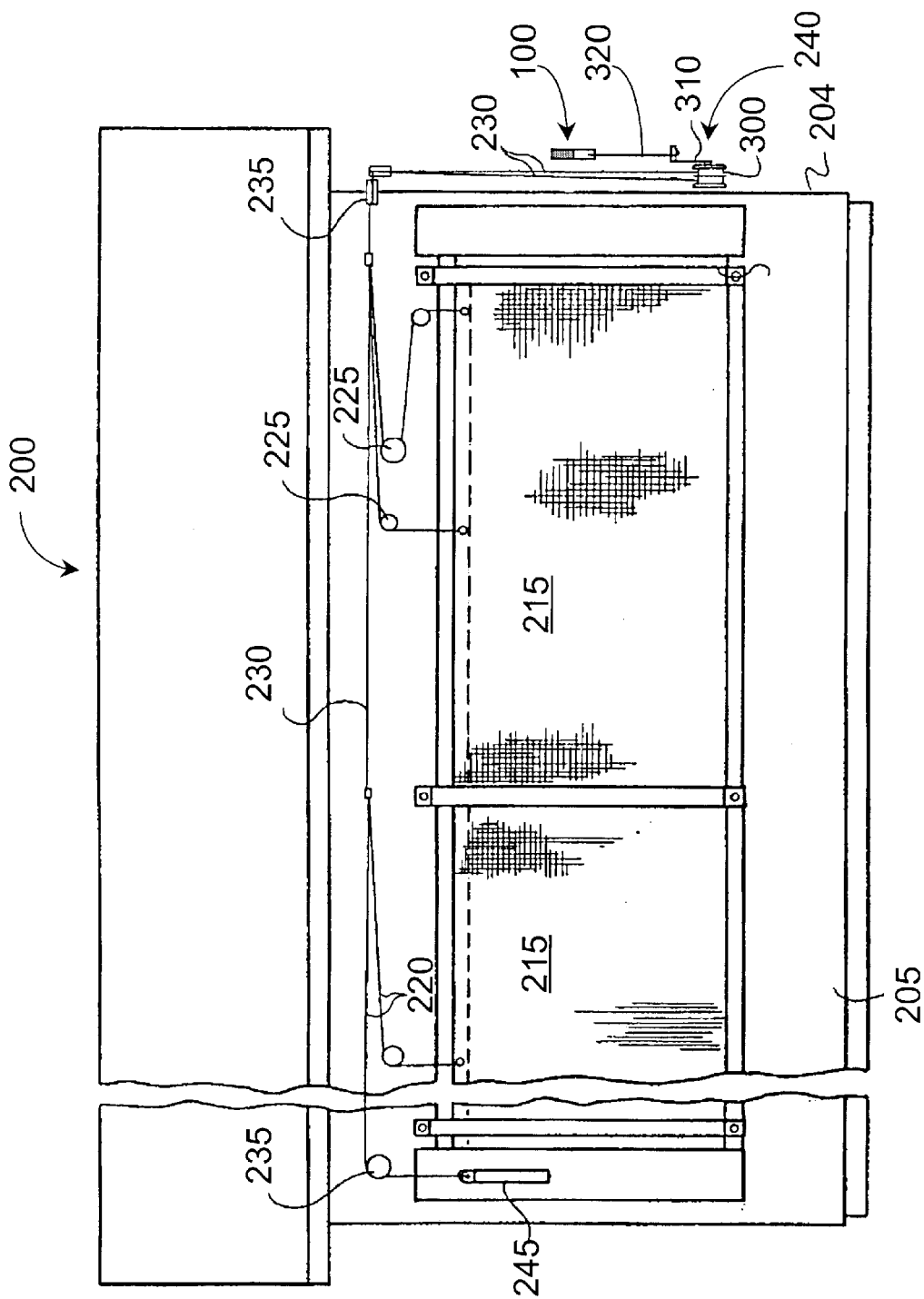
FIG. 3 is a front view of a ventilation curtain.

Referring now to FIG. 3, the winch 240 comprises a drum 300 and a winch manual hand-crank 310. The winch handle 310 is used to manually raise or lower the ventilation curtains 215. The winch manual hand-crank 310 is held stationary under the load of the ventilation curtains 215 by a tension device 320, one end of which is affixed to the winch manual hand-crank 310. The other end of the tension device 320 is affixed to the safety ventilation curtain release device 100.

Figure 4:
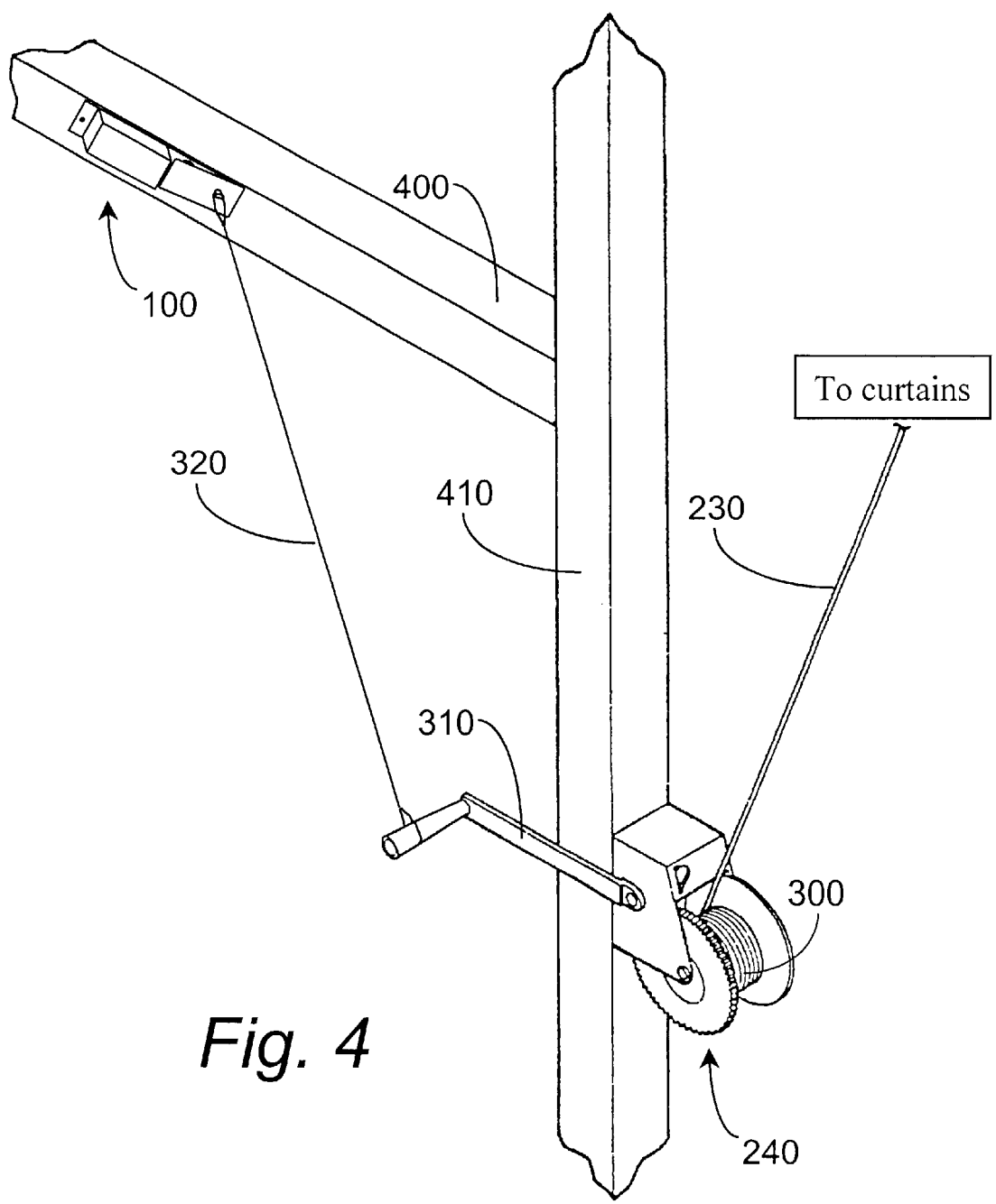
FIG. 4 is a perspective view of a manual hand-crank being held with a tension device secured to the safety ventilation curtain release device.

The safety ventilation curtain release device may be mounted in a variety of locations and positions as seen in FIG. 4, where the safety ventilation curtain release device 100 is shown mounted on a cross-beam 400. The winch 240 is mounted on a post 410. The tension device 320 connecting the safety ventilation curtain release device 100 and the winch manual hand-crank 310 is clearly seen.

Figure 5:
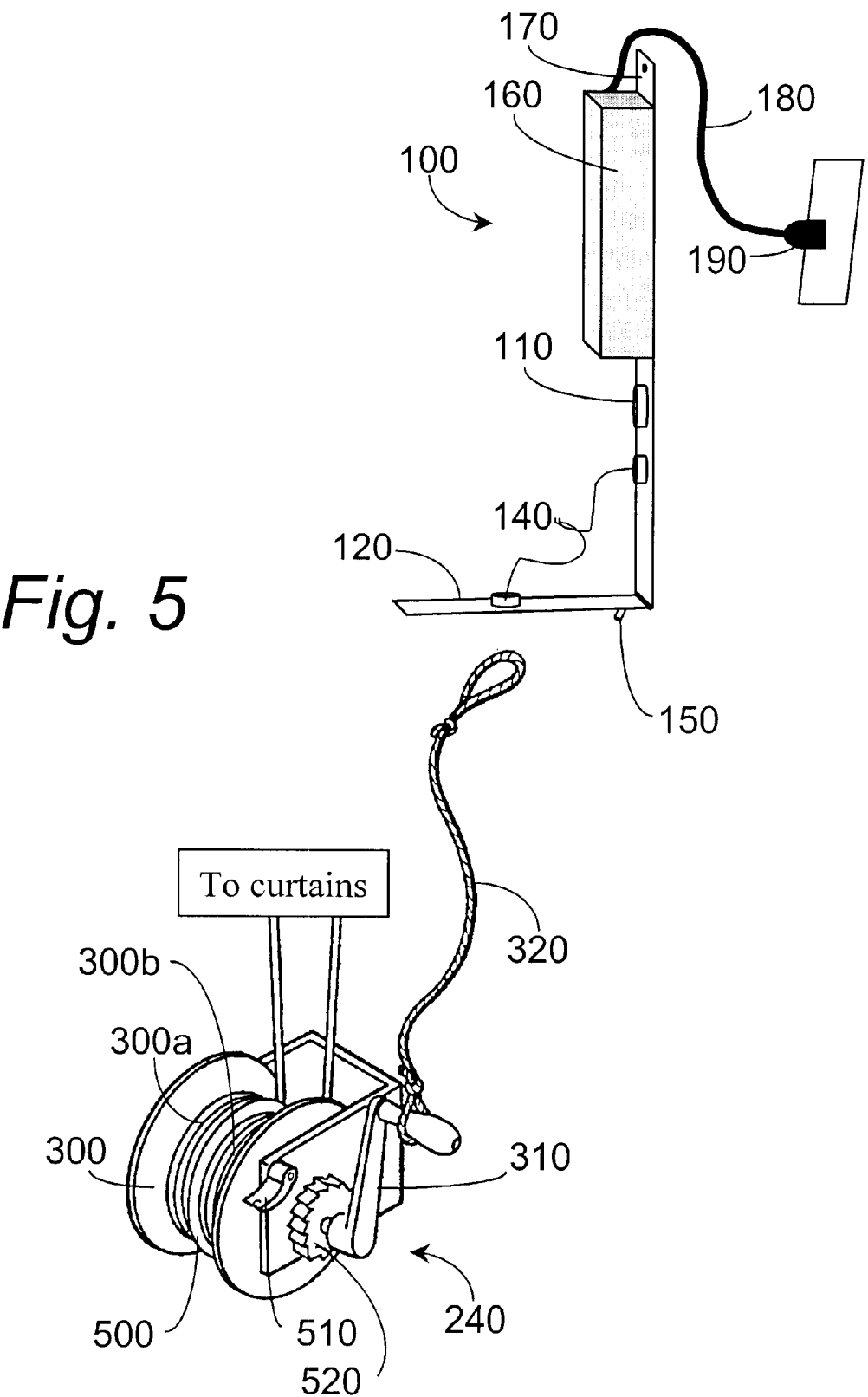
FIG. 5 is a view of the safety ventilation curtain release device as it releases a tension device connected to a curtain hand-crank.

A tension device 320 is shown just as it is released in FIG. 5. The tension device need not extend from the hook or peg 150 to the winch manual hand-crank 310. The winch 240 includes a drum 300. If the winch 240 is used to raise and lower curtains 215 on both sides 205 of the house 200 as per FIG. 2, the drum 300 is divided into two sections, 300a and 300b, by means of an enlarged diameter ring 500 positioned in the middle of the drum. One drum section 300a winds the cable 230 from one side of the house 200 while the other drum section 300b winds the cable 230 from the other side of the house 200. The winch 240 is operated by means of a winch manual hand-crank 260, which turns the drum 300 through a conventional gearing device. The winch 240 also includes a lock 510 which, when in position, engages a ratchet 520 and prevents the drum 300 from unwinding the cable 230.

Figure 6:
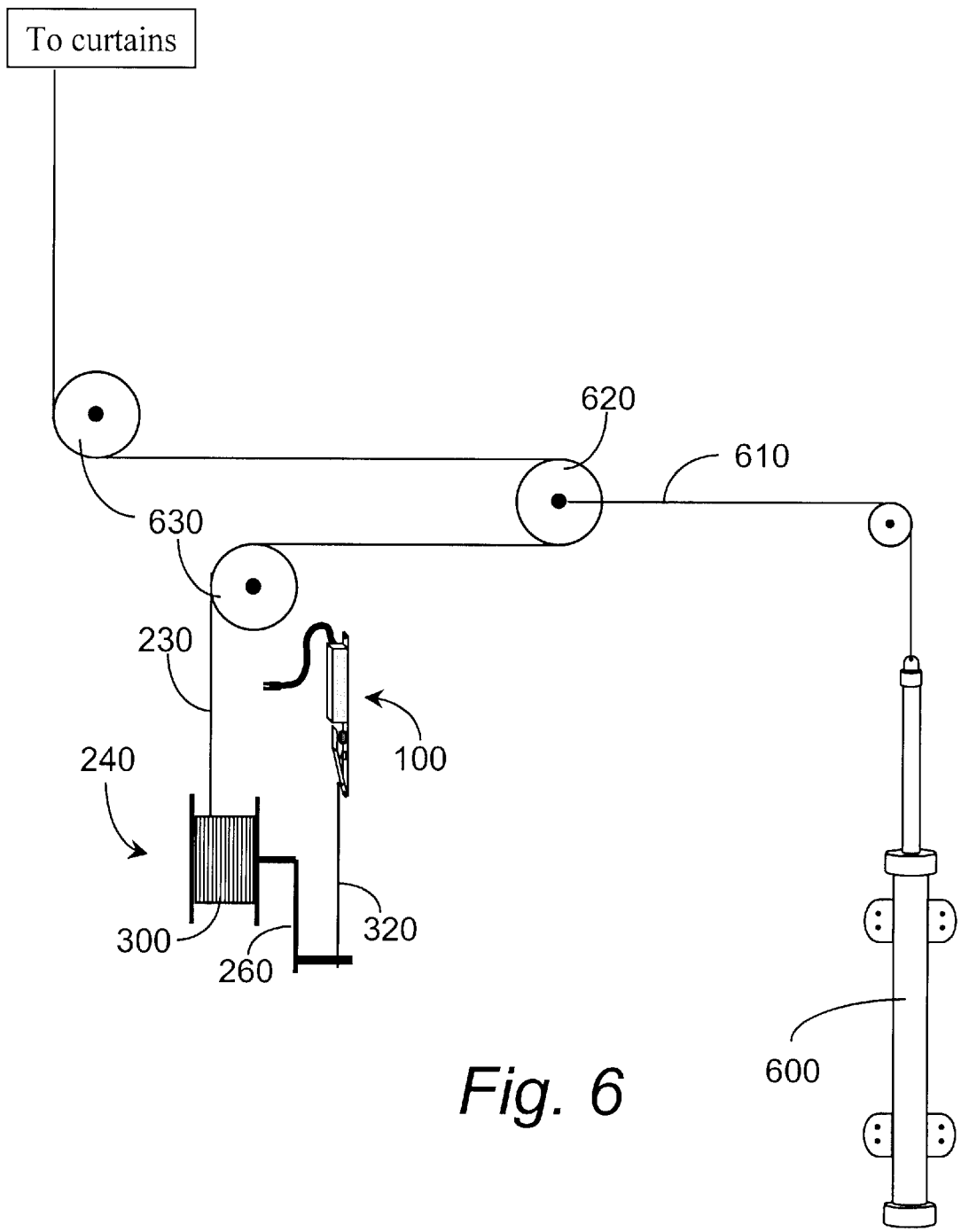
FIG. 6 is a schematic of the ventilation curtain raising system.

Automatic curtain control systems are not shown in FIGS. 2 and 3. The automatic aspect of curtain position control is shown, schematically, in FIG. 6. A linear actuator 600, chosen from a set comprising an electrically driven screw actuator, a hydraulic cylinder, and a pneumatic cylinder, provides the motive force required to raise and lower the curtains 215. The linear actuator 600 pulls on a cable 610 that is operably attached to the pivot point of a pulley 620, through which the cable 230 leading from the winch 240 passes. The placement of two additional pulleys 630 provide the option of using the winch 240 or the linear actuator 600 to manipulate the ventilation curtains 215.

Figure 7:
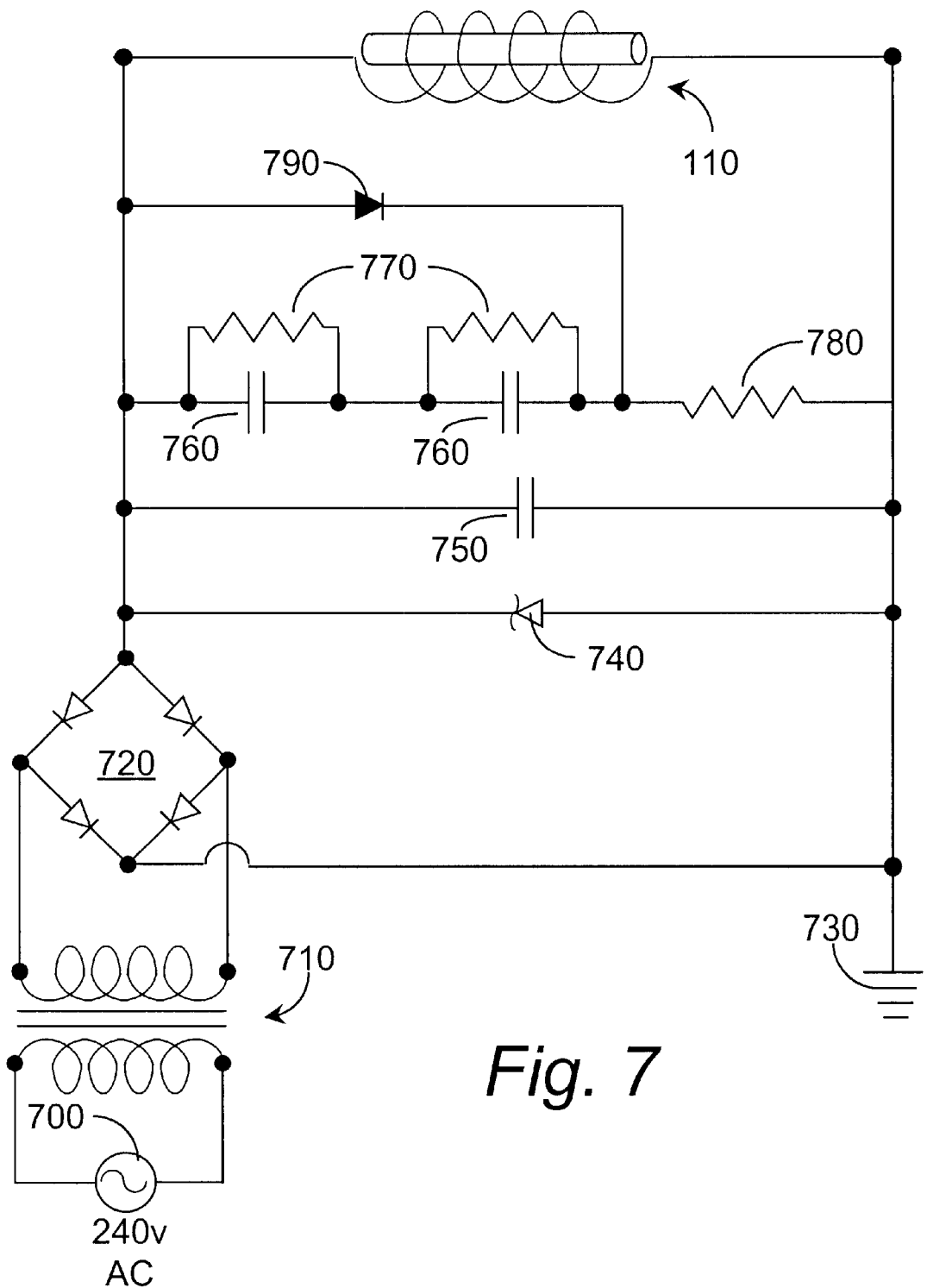
FIG. 7 is a wiring diagram for the safety ventilation curtain release device.

A wiring schematic for the safety ventilation curtain release device is shown in FIG. 7. The unit is plugged into the same 240 volt source 700 the ventilation fans 250 utilize. After passing through a transformer 710 to drop the voltage, the AC current is rectified in a full-bridge rectifier 720 to convert it to a pulsating DC. One leg of the full-bridge rectifier 720 goes to ground 730, the other is connected with several components in parallel. A Zener diode 740 rated at 5.6 v is the first component. In parallel with the Zener diode 740 is a standard 4700 $\mu$F capacitor 750. In parallel with the Zener diode 740 and the standard capacitor 750 are two capacitors 760, the purpose of which is to provide energizing current to the electromagnet 110 during brief grid power interruptions. Preferably, each capacitor 760 would be a supercapacitor, having a total capacitance on the order of 100 Farads. In parallel with each capacitor 760 is a 5 k$\Omega$ resistor 770. In series with the capacitors 760 and resistors 770 is a 1$\Omega$ resistor 780. A Light Emitting Diode (LED) 790 is placed in parallel with the capacitors 760, but not the 1$\Omega$ resisitor 780. Finally, the electromagnet 110 is placed in parallel with the Zener diode 740 and the standard capacitor 750. If either or both legs of the power are interrupted, the capacitors 760 will provide power to the electromagnet 110 during a time span in which the capacitors 760 discharge. Once discharged, the electromagnet 110 releases the hinged section 120, indirectly dropping the curtains open, unless electrical power is restored before the capacitors 760 have discharged.

Figure 8:
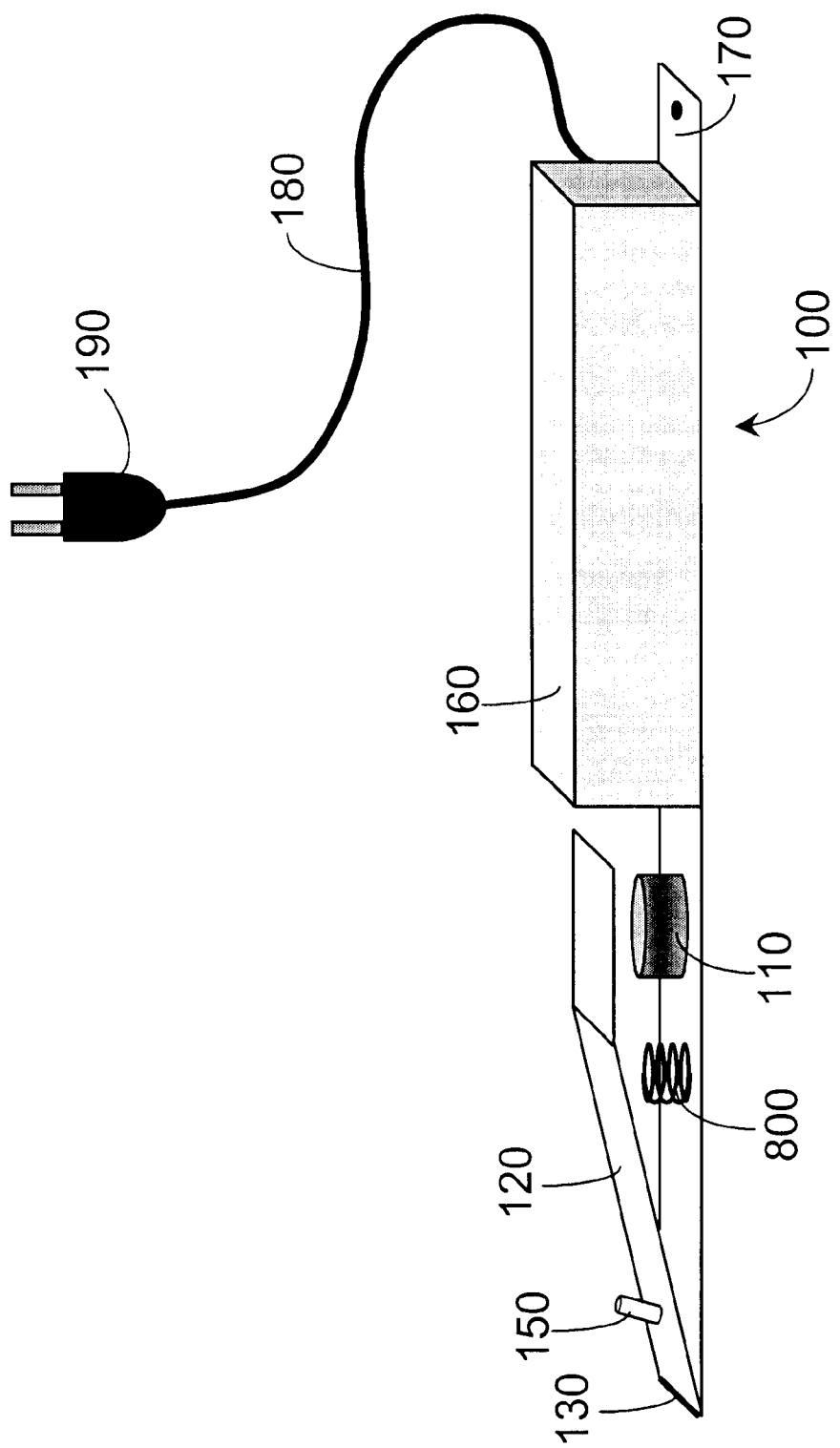
FIG. 8 is a perspective view of a second embodiment of the invention.

In FIG. 8, an additional embodiment of the present invention is illustrated. Here, the repulsive force for ensuring the hinged plate 120 opens and releases the tension device 320 is provided by a spring 800 or other elastic material instead of the permanent magnets 140. The spring 800 is compressed when the hinged plate 120 is pressed toward the electromagnet 110, and is held in a compressed state by the force of the electromagnet 110 as long as the electromagnet 110 is energized.

Figure 9:
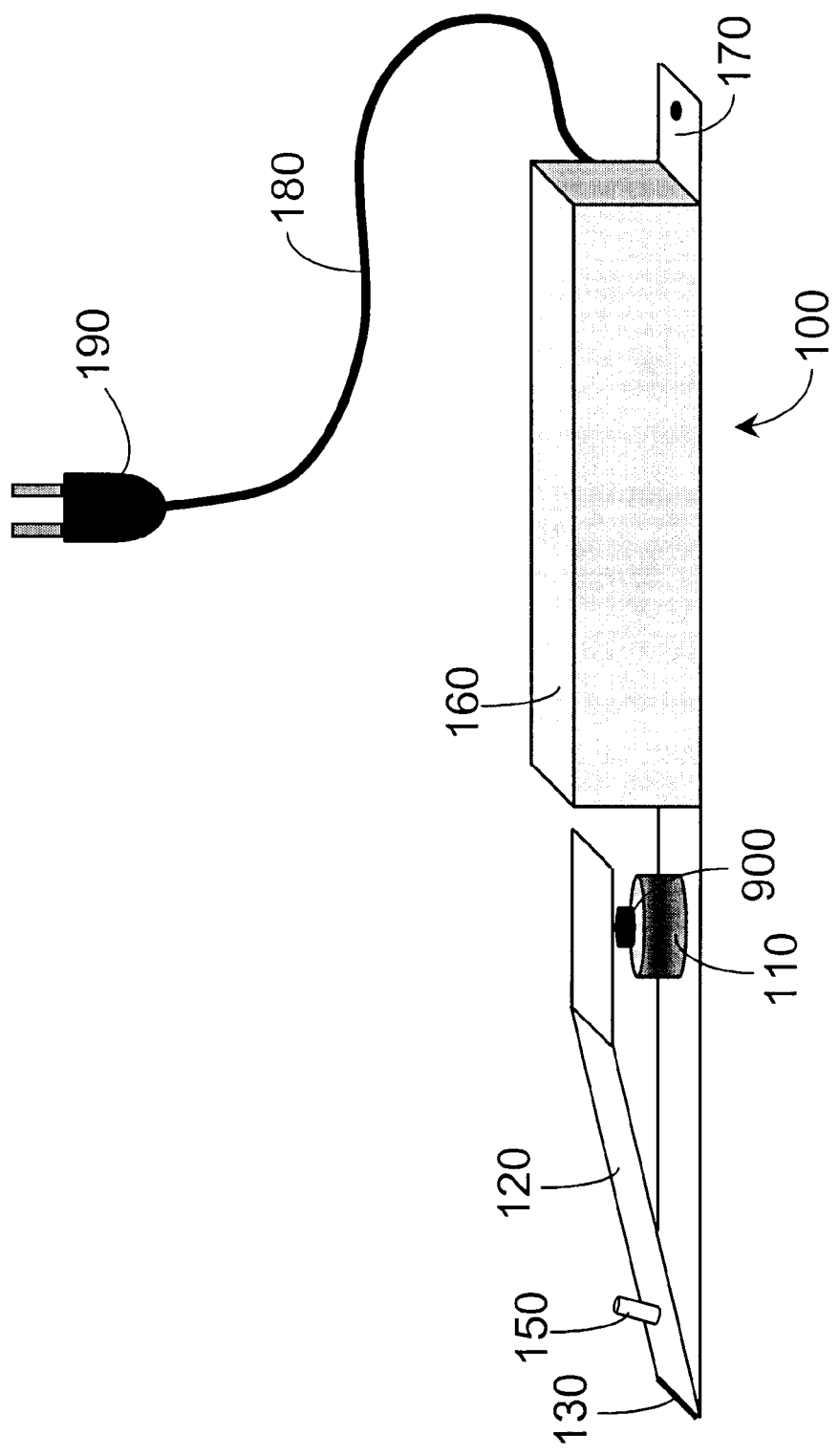
FIG. 9 is a perspective view of a third embodiment of the invention.
Figure 10:
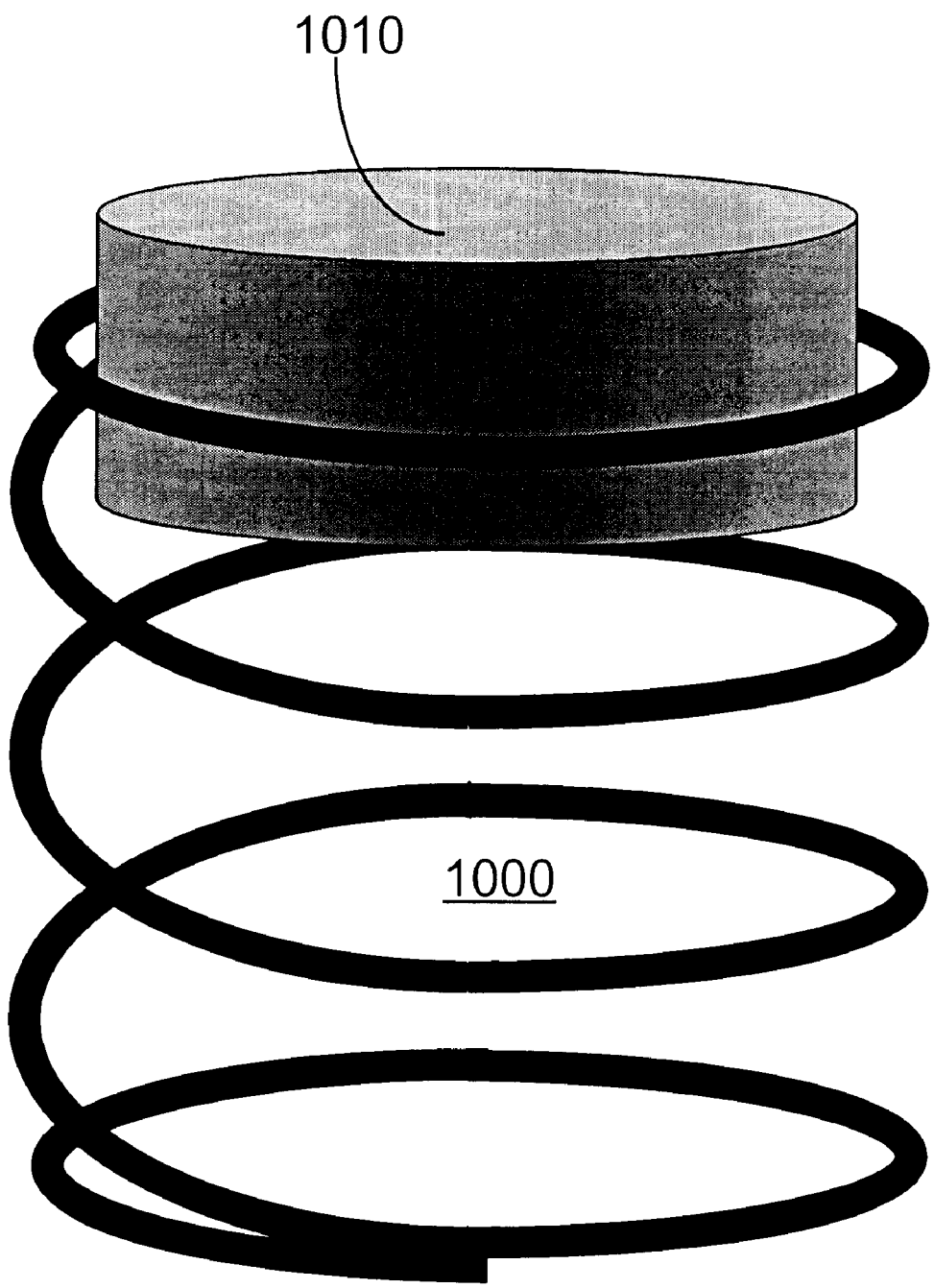
FIG. 10 is a view of a spring with a ferrous core.

Still another embodiment is shown in FIG. 9. A spring and core assembly 900 (see also FIG. 10) is contained inside the electromagnet 110, which has a recess for the spring and core assembly 900. Energizing the electromagnet 110 results in the core 1010 being drawn into the electromagnet 110, permitting the hinged plate 120 to be held in its "hold" position without a continuous force in a direction opposite that applied by the electromagnet 110. When the electromagnet 110 is deenergized, the core 1010 is released and the spring 1000 forces the core 1010 out of the electromagnet 110 pushing the hinged plate 120 to release the tension device 320.

Figure 11:
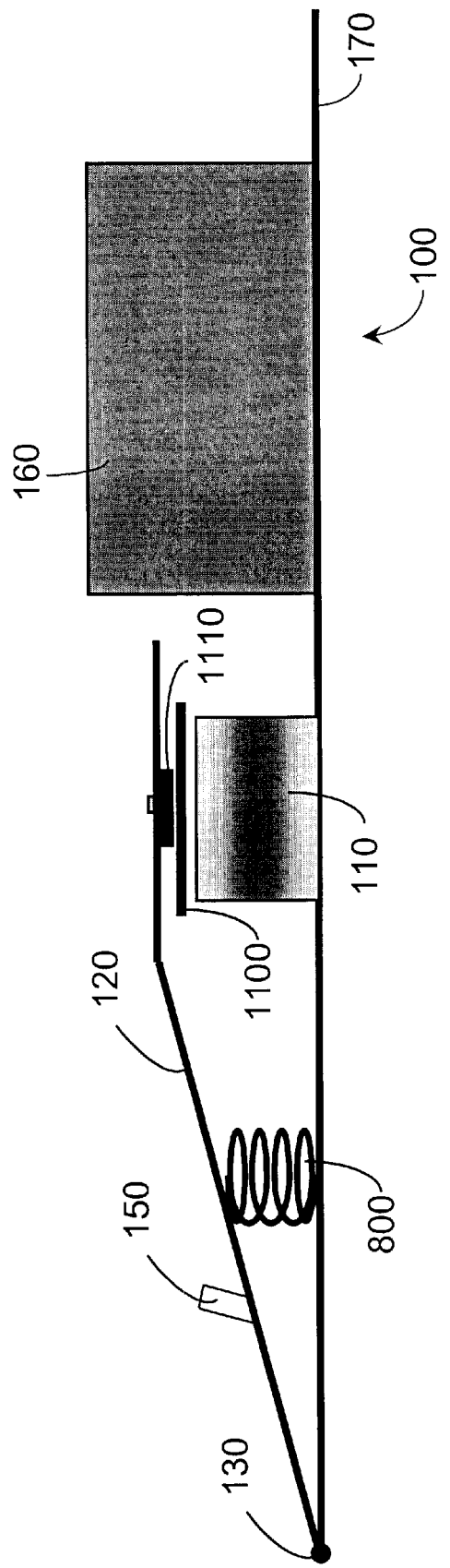
FIG. 11 is a side elevation view of the present invention.

A detailed view of the present invention is shown in FIG. 11. In particular, a magnet pad 1100 is clearly shown. The hinged plate 120 may be used as the armature, but a magnet pad 1100 is made to engage the electromagnet 110 more securely. The magnet pad 1100 is made of a ferrous material and is mounted such that a flexible washer 1110, such as a rubber grommet, is sandwiched between the magnet pad 1100 and the hinged plate 120.

Figure 12:
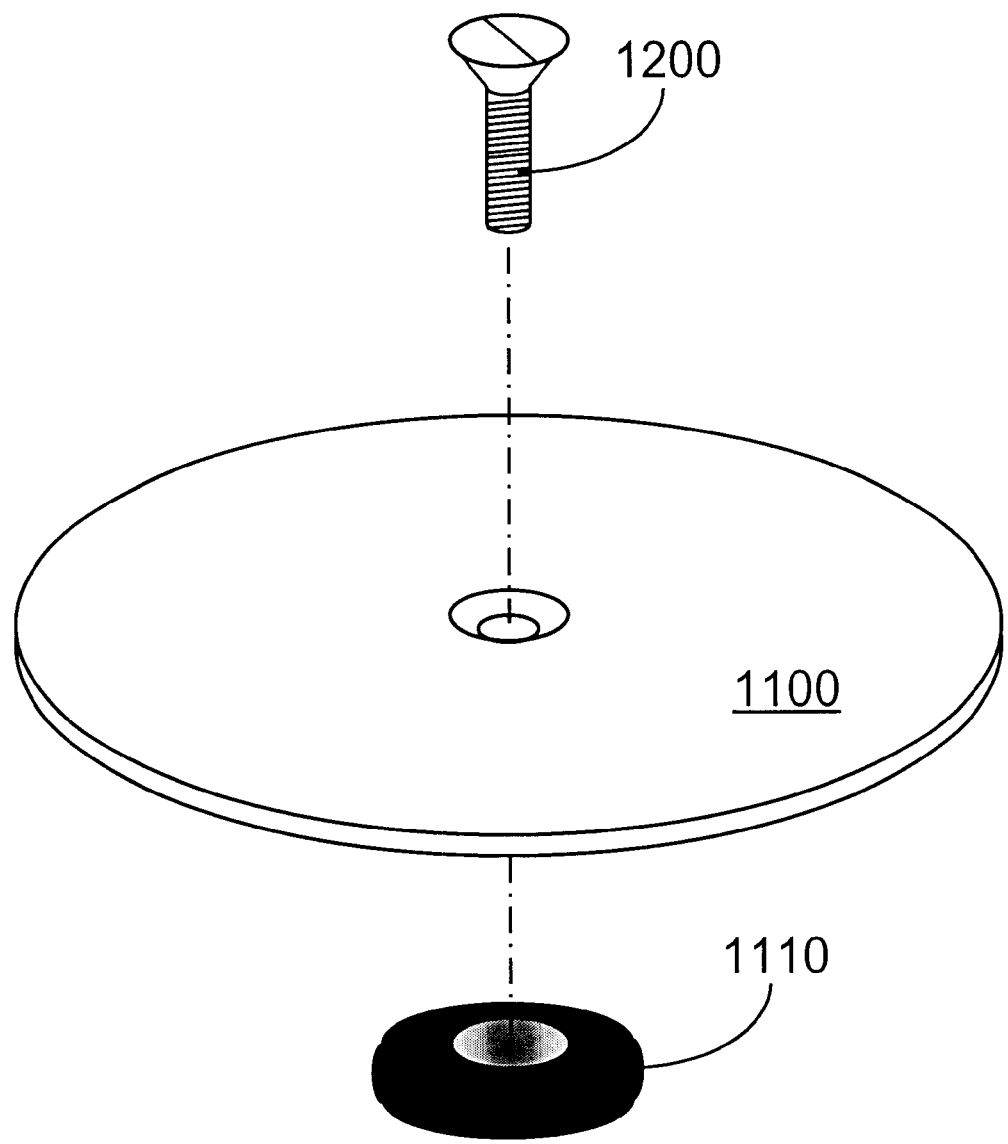
FIG. 12 is a detail of a magnet pad with an elastic washer and flat-headed machine screw for mounting the magnet pad and elastic washer.

The magnet pad 1100 is shown again in FIG. 12. The flexible washer 1110 is also shown. A flat headed machine screw 1200 passes through both the magnet pad 1100 and the flexible washer 1110. A tapered hole is machined into the magnet pad 1100 so the flat headed machine screw 1200 may be countersunk into the magnet pad 1100. The flexible washer 1110 permits the magnet pad 1100 to conform to the top of the electromagnet 110, relieving manufacturing tolerances.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method for causing the release of ventilation curtains in a livestock confinement house using a safety ventilation curtain release device comprising a hinged plate securing a tension device, the method comprising the steps of:
    (a) switching off energizing current to an electromagnet holding the hinged plate in place; and
    (b) forcing said hinged plate away from the electromagnet with a force not a tension on the tension device.

2. The method of claim 1 wherein the forcing of the hinged plate is accomplished by two permanent magnets with like poles adjacent to one another.

3. The method of claim 1 wherein the forcing of the hinged plate is accomplished by a spring.

4. The method of claim 1 wherein the forcing of the hinged plate is accomplished by a spring with a ferrous core that is drawn toward the electromagnet when said electromagnet is energized.

5. The method of claim 1 wherein the energizing current to the electromagnet becomes insufficient to hold the hinged plate after a predetermined time, the predetermined time measured from when grid power is interrupted.

6. The method of claim 1 wherein the energizing current to the electromagnet is provided by at least one capacitor during a time period starting when grid power is interrupted.

7. The method of claim 6 wherein the at least one capacitor is a supercapacitor.

8. The method of claim 1 wherein the safety ventilation curtain release device is powered by a same 240 volt circuit used by ventilation fans.

9. The method of claim 1 wherein an end of the tension device is operably. attached to a manual ventilation curtain winch crank such that, when the energizing current to the electromagnet is switched off, a second end of the tension device is released and the winch crank is free to rotate.

10. A method for causing the release of ventilation curtains in a livestock confinement house using a safety ventilation curtain release device comprising a hinged plate securing a tension device to which a manual ventilation curtain crank is operably attached, the method comprising the steps of:

(a) detecting when electrical power is interrupted to ventilation fans in the livestock confinement house;

(b) timing a predetermined time span initialized when the electrical power is interrupted to the ventilation fans in the livestock confinement house;

(c) switching off energizing current to an electromagnet holding the hinged plate in place at the end of the predetermined time span;

(d) forcing said hinged plate away from the electromagnet with a force not a tension on the tension device;

(e) releasing said tension device from the hinged plate by which it was secured; and (f) permitting the manual ventilation curtain crank to turn freely.

11. An apparatus for causing the release of ventilation curtains in a livestock confinement house the apparatus comprising:

(a) a hinged plate securing a tension device;

(b) an electromagnet for holding the hinged plate in place; and (c) forcing means, not a tension on a tension device, for repelling said hinged plate away from the electromagnet.

12. The apparatus of claim 11 wherein the forcing means is two permanent magnets with like poles adjacent to one another.

13. The apparatus of claim 11 wherein the forcing means is a spring.

14. The apparatus of claim 11 wherein the forcing means is a spring with a ferrous core that is drawn toward the electromagnet when said electromagnet is energized.

15. The apparatus of claim 11 wherein the energizing current to the electromagnet becomes insufficient to hold the hinged plate after a predetermined time, the predetermined time measured from when grid power is interrupted.

16. The apparatus of claim 11 additionally comprising at least one capacitor to provide the energizing current to the electromagnet during a time period starting when grid power is interrupted.

17. The apparatus of claim 16 wherein the at least one capacitor is a supercapacitor.

18. The apparatus of claim 11 wherein the safety ventilation curtain release device is powered by a same 240 volt circuit used by ventilation fans.

19. The apparatus of claim 11 wherein an end of the tension device is operably attached to a manual ventilation curtain winch crank such that, when the energizing current to the electromagnet is switched off, a second end of the tension device is released and the winch crank is free to rotate.

20. An apparatus for causing the release of ventilation curtains in a livestock confinement house the apparatus comprising:

(a) a hinged plate;

(b) a hook or peg operably attached to or integral to the hinged plate;

(c) a tension device, one end of which is secured to said hook or peg;

(d) a manual ventilation curtain winch manual hand-crank to which a second end of said tension device is operably attached;

(e) an electromagnet for holding the hinged plate in place;

(f) a magnet pad, operably attached to the hinged plate; and (g) forcing means, not a tension on the tension device, for repelling said hinged plate away from the electromagnet.

* * * * *